(12) United States Patent
Chen et al.

(10) Patent No.: US 12,366,668 B2
(45) Date of Patent: Jul. 22, 2025

(54) POSITIONING METHODS AND CLOUD DEVICE

(71) Applicant: BEIJING BAIDU NETCOM SCIENCE TECHNOLOGY CO., LTD., Beijing (CN)

(72) Inventors: Xi Chen, Beijing (CN); Guangdi Shan, Beijing (CN); Wei Li, Beijing (CN); Fangsheng Jiang, Beijing (CN); Hailu Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 347 days.

(21) Appl. No.: 18/048,944

(22) Filed: Oct. 24, 2022

(65) Prior Publication Data
US 2023/0070349 A1 Mar. 9, 2023

(30) Foreign Application Priority Data
Oct. 29, 2021 (CN) .......................... 202111274347.1

(51) Int. Cl.
*G01S 19/47* (2010.01)
*G01S 19/43* (2010.01)

(52) U.S. Cl.
CPC .............. *G01S 19/47* (2013.01); *G01S 19/43* (2013.01)

(58) Field of Classification Search
CPC .......... G01S 19/09; G01S 19/43; G01S 19/47; G01S 19/49
See application file for complete search history.

(56) References Cited

U.S. PATENT DOCUMENTS

| 10,158,978 | B1* | 12/2018 | Jantzi | ...................... G01S 19/47 |
| 2021/0132236 | A1* | 5/2021 | Cookman | ............ G01S 19/428 |

FOREIGN PATENT DOCUMENTS

| CN | 101606080 | | 12/2009 | | |
| CN | 103852773 | | 6/2014 | | |
| CN | 103852773 | A * | 6/2014 | ............. | G01S 19/42 |
| CN | 105158778 | | 12/2015 | | |
| CN | 108267135 | | 7/2018 | | |
| CN | 108873023 | | 11/2018 | | |
| CN | 109633718 | | 4/2019 | | |
| CN | 109633718 | A * | 4/2019 | ............. | G01S 19/42 |
| CN | 110389365 | | 10/2019 | | |
| CN | 111045052 | | 4/2020 | | |

(Continued)

OTHER PUBLICATIONS

IEEE Standard for Inertial Systems Terminology, IEEE Std 1559™—2009, IEEE Aerospace and Electronics Systems Society, 2009 (Year: 2009).*

(Continued)

*Primary Examiner* — Bernarr E Gregory
*Assistant Examiner* — Fred H Mull
(74) *Attorney, Agent, or Firm* — Hodgson Russ LLP

(57) ABSTRACT

A positioning method includes: receiving detection data sent by a positioning device, in which the detection data includes first satellite data of multiple satellites; determining prediction noise of each satellite based on the first satellite data, and determining a weight of each satellite based on the prediction noise; and determining a position of the positioning device based on the weight and observation equations.

14 Claims, 2 Drawing Sheets

--- receiving detection data sent by a positioning device, wherein the detection data comprises first satellite data of each satellite — S201 determining prediction noise of each satellite based on the first satellite data, and determining a weight of each satellite based on the prediction noise — S202 determining a position of the positioning device based on the weight and observation equations — S203

(56) References Cited

FOREIGN PATENT DOCUMENTS

| | | | | | |
|---|---|---|---|---|---|
| CN | 109633718 | B | * | 1/2021 | ............. G01S 19/42 |
| CN | 112305574 | | | 2/2021 | |
| CN | 112305574 | A | * | 2/2021 | ............. G01S 19/44 |
| CN | 115166804 | A | * | 10/2022 | |
| JP | 2009121971 | | | 6/2009 | |
| JP | 2016194417 | A | * | 11/2016 | |

OTHER PUBLICATIONS

CNIPA, First Office Action for CN Application No. 202111274347.1, Sep. 26, 2023.

* cited by examiner

US 12,366,668 B2

POSITIONING METHODS AND CLOUD DEVICE

CROSS REFERENCE TO RELATED APPLICATIONS

This application claims priority to Chinese Patent Application No. 202111274347.1, filed on Oct. 29, 2021, the entire disclosure of which is incorporated herein by reference.

TECHNICAL FIELD

The disclosure relates to positioning technologies in the field of artificial intelligence technology, and in particular to a positioning method, a positioning apparatus and an electronic device.

BACKGROUND

Position information is the basic information for a map application to realize different capabilities. Common methods for acquiring the position information include satellite-based positioning methods, base station-based positioning methods, and Bluetooth-based positioning methods.

SUMMARY

According to a first aspect of the disclosure, a positioning method is provided, which is implemented by a cloud device. The method includes: receiving detection data sent by a positioning device, in which the detection data includes first satellite data of each satellite; determining prediction noise of each satellite based on the first satellite data, and determining a weight of each satellite based on the prediction noise; and determining a position of the positioning device based on the weight and observation equations of each satellite.

According to a second aspect of the disclosure, another positioning method is provided, which is implemented by a positioning device. The method includes: receiving signals from each satellite, and obtaining first satellite data by analyzing the signals; sending detection data to a cloud device, in which the detection data includes the first satellite data; and receiving a position of the positioning device sent by the cloud device, in which the position of the positioning device is determined based on the first satellite data.

According to a third aspect of the disclosure, a cloud device for positioning is provided. The cloud device includes: at least one processor and a memory stored with instructions executable by the at least one processor. When the instructions are executed by the at least one processor, the at least one processor is enabled to: receive detection data sent by a positioning device, in which the detection data includes first satellite data of each satellite; determine prediction noise of each satellite based on the first satellite data, and determine a weight of each satellite based on the prediction noise; and determine a position of the positioning device based on the weight and observation equations of each satellite.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

In the related art, the satellite-based positioning method includes receiving and analyzing satellite signals, and calculating the position information based on the satellite signals. However, the satellite positioning accuracy is relatively low in the existing satellite-based positioning methods. The present disclosure aims at a positioning method, with the improved positioning accuracy.

Figure 1:
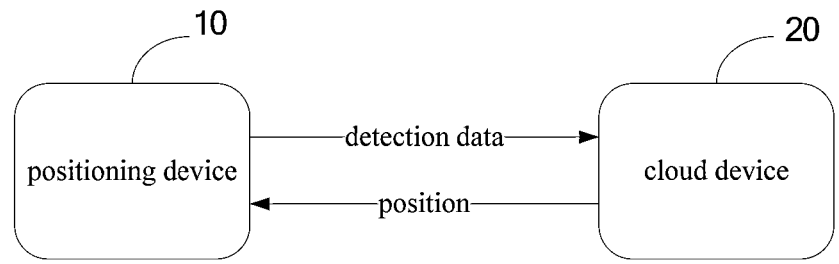
FIG. 1 is a schematic diagram of a scene for a positioning method according to an embodiment of the disclosure.

FIG. 1 is a schematic diagram of a scene for a positioning method according to an embodiment of the disclosure. As illustrated in FIG. 1, a positioning device 10 is configured to receive and analyze the satellite signals, and send the analyzed data to a cloud device 20. Then the cloud device 20 determines the position of the positioning device 10 according to the received analyzed data. In this scene, the positioning device 10 only needs to receive and analyze the satellite signals without performing the position calculation. The cloud device 20 performs the position calculation. The positioning device 10 itself may not have the capability of position calculation, which reduces the cost and volume of the positioning device 10. At the same time, the powerful processing capability of the cloud device 20 can ensure higher positioning accuracy.

In the satellite-based positioning methods, the positioning accuracy is related to the satellite signal. When the quality of the satellite signal is not good, with too much noise, the accuracy of the positioning result is generally low. Therefore, the embodiments of the disclosure propose that the prediction noise of the satellite signal is determined before the position calculation, and the weight of the satellite is determined according to the prediction noise of the satellite signal. During the position calculation, the weight of the satellite is combined with the satellite signal, to improve the positioning accuracy.

The disclosure provides a positioning method, a positioning apparatus, an electronic device, a storage medium and a program product, which are applicable to the field of positioning in the field of artificial intelligence technology, in particular applicable to scenes such as electronic maps and smart transportation, so as to improve the positioning accuracy.

The positioning method of the disclosure will be described in detail through specific embodiments as follows. It should be understood that the following specific embodiments may be combined with each other, and the same or similar concepts or processes may not be repeated in some embodiments.

Figure 2:
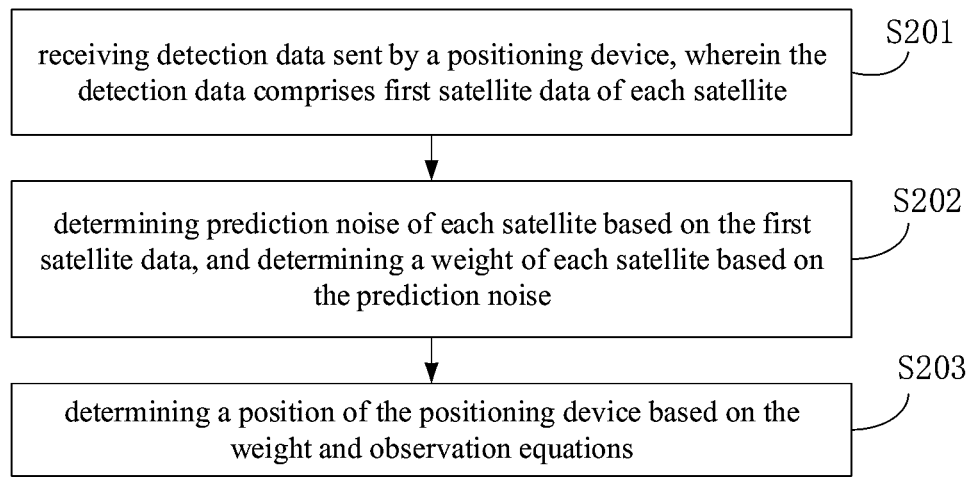
FIG. 2 is a flowchart of a positioning method according to an embodiment of the disclosure.

FIG. 2 is a flowchart of a positioning method according to an embodiment of the disclosure. The method is executed by a positioning apparatus, and the apparatus can be implemented by means of software and/or hardware. Optionally, the apparatus is a cloud device. As shown in FIG. 2, the method includes the following steps.

At block S201, detection data sent by a positioning device is obtained, in which the detection data includes first satellite data of each satellite.

The positioning device in the embodiments of the disclosure is a device whose position information is to be determined. Optionally, the positioning device has a signal receiving module and a communication module. The signal receiving module is an antenna module for receiving and analyzing satellite signals of the multiple satellites, to obtain the first satellite data, such as a pseudo-range, a carrier phase, Doppler and a signal-to-noise ratio. The communication module is configured to send the first satellite data of each of the satellites to the cloud device.

At block S202, prediction noise of each of the satellites is determined based on the first satellite data, and a weight of each of the satellites is determined based on the prediction noise.

The prediction noise of each of the satellites, that is, the prediction noise of the satellite signal, may be determined according to the first satellite data based on the historical experience values, or may be predicted by deep learning method, which is not limited in the embodiments of the disclosure. The magnitude of the prediction noise can reflect the quality of the satellite signal, that is, the quality of the first satellite data. Since the first satellite data of some or all of the satellites are required for subsequent position calculation, the weight of each of the satellites may be determined based on the prediction noise, and the weight is negatively correlated with the prediction noise. That is, the larger the prediction noise of the satellite, the smaller the weight of the satellite, and the smaller the prediction noise of the satellite, the larger the weight of the satellite.

At block S203, a position of the positioning device is determined based on the weight and observation equations.

The observation equations may include an equation of pseudo-range observation and an equation of phase observation. Based on the first satellite data of each satellite, the observation equation corresponding to each satellite can be determined. In the embodiments of the disclosure, the observation equations are not described in detail. Since the prediction noise of each satellite may be different, that is, the signal quality of the satellite is different, when performing the position calculation according to the observation equations of each satellite, the corresponding weight can be added to the observation equations of the satellite. The smaller the prediction noise of the satellite, the higher the weight of its observation equations, and the larger the prediction noise of the satellite, the lower the weight of its observation equations. Thus the position accuracy of the calculated positioning device is high.

In the method of the embodiments of the disclosure, when performing the satellite position calculation, the prediction noise of the satellite can be determined firstly according to the first satellite data, and then the weight of the satellite is determined according to the prediction noise of the satellite, so that the smaller the prediction noise, the larger the weight of the observation equations, and the larger the prediction noise, the smaller the weight of the observation equations. Thus the positioning accuracy can be improved.

In the above embodiments, the first satellite data may include a signal-to-noise ratio, and the positioning device or the cloud device may firstly filter the first satellite data of each satellite based on the signal-to-noise ratio, so as to screen out the first satellite data with low signal-to-noise ratio, and perform positioning based on the filtered first satellite data.

On the basis of the above embodiments, how to determine the prediction noise of the satellite will be described.

Optionally, annotation information is added to the first satellite data with carrier phase cycle slips in the first satellite data. The prediction noise of the satellite is determined according to the first satellite data and the annotation information.

The method for annotating cycle slips may be annotating according to Doppler data, or according to phase combinations of different frequency band. After adding the annotation information, the prediction noise of the satellite is determined based on the first satellite data and the annotation information. The prediction noise of the satellite is determined based on the first satellite data and the cycle slips annotation information, to improve the prediction accuracy.

Optionally, in the embodiment of the disclosure, a noise prediction model can be pre-trained, and the noise prediction model is obtained by training based on prior data (e.g., satellite signal data, cycle slips annotation information, positioning results, and labeled real positions). The first satellite data and the annotation information are input into the pre-trained noise prediction model, to obtain the prediction noise of the satellite. That is, the pseudo-range, carrier phase, Doppler, signal-to-noise ratio and the annotation information are input into the pre-trained noise prediction model, to obtain the prediction noise of the satellite.

On the basis of the above embodiments, how to determine the observation equation will be described.

In addition to obtaining the first satellite data, the cloud device obtains second satellite data of a reference station corresponding to the positioning device, generates a first observation equation corresponding to the reference station based on the second satellite data, generates a second observation equation corresponding to the positioning device based on the first satellite data, and determines the observation equation based on the first observation equation corresponding to the reference station and the second observation equation corresponding to the positioning device.

Moreover, obtaining the second satellite data of the reference station corresponding to the positioning device includes: determining a coarse position corresponding to the positioning device based on the first satellite data; and obtaining the second satellite data of the reference station corresponding to the positioning device based on the coarse position.

The cloud device obtains the coarse position of the positioning device by performing single-point positioning according to information such as pseudo-ranges in the first satellite data. Moreover, the cloud device determines the reference station near the coarse position, that is, the reference station corresponding to the positioning device, and obtains the second satellite data of the reference station. The second satellite data includes a pseudo-range, a carrier phase, Doppler, a signal-to-noise ratio, and the like.

In addition, before establishing the observation equations, the cloud device may determine the satellite position according to ephemeris data, and generate the first observation equation and the second observation equation of each satellite based on the satellite position. By calculating a difference between the second observation equation corresponding to the positioning device and the first observation equation corresponding to the reference station, a common view error between the reference station and the positioning device can be eliminated. In addition, by calculating differences among the second observation equations of respective satellites corresponding to the positioning device, satellite clock difference can be eliminated, so as to obtain the observation equations of each satellite. When solving the observation equations of each satellite, the weight of the satellite is used as the weight of the observation equations of the satellite, and the observation equations are solved based on weighted least squares, to obtain the position of the positioning device, thus improving the positioning accuracy.

In the above embodiments, for each of the satellites, the weight of the observation equations may be applied to the weighted least squares. Then, according to the weighted least squares, the observation equations of the satellite may be solved, thus improving the positioning accuracy. On the basis of the above embodiments, the detection data sent by the positioning device to the cloud device may also include inertial measurement unit (IMU) data of the positioning device. Optionally, the positioning device has an inertial sensor module for obtaining the IMU data.

Correspondingly, after the position of the positioning device is determined based on the above satellite data, the IMU data and the position of the positioning device may be fused to update the position of the positioning device. For example, Kalman filtering is performed on the position of the positioning device and the IMU data, to obtain a new position of the positioning device, thus the positioning accuracy is improved by the fusion positioning method.

On the basis of the above embodiments, after the cloud device determines the position of the positioning device, the cloud device can also send the position of the positioning device to the positioning device, so that the positioning device can apply the position information.

Corresponding to the above method performed by the cloud device, the embodiments of the disclosure also provides a positioning method performed by a positioning device. The method includes: receiving signals from each satellite, and obtaining first satellite data by analyzing the signals; sending detection data to a cloud device, in which the detection data includes the first satellite data; and receiving a position of the positioning device sent by the cloud device, in which the position of the positioning device is determined based on the first satellite data. Optionally, the detection data also includes the IMU data of the positioning device, and the IMU data is used to update the position of the positioning device. How to determine the position of the positioning device may refer to the above embodiments, which will not be repeated here.

Optionally, the positioning device can also send its position to other terminals. For example, when a user carries the positioning device and a mobile phone, since the positioning accuracy of the mobile phone may be poor, the positioning device can obtain a position by a positioning process and then send the obtained position to the mobile phone. Thus the mobile phone can use the obtained position in application programs such as a map application for positioning or navigation.

Figure 3:
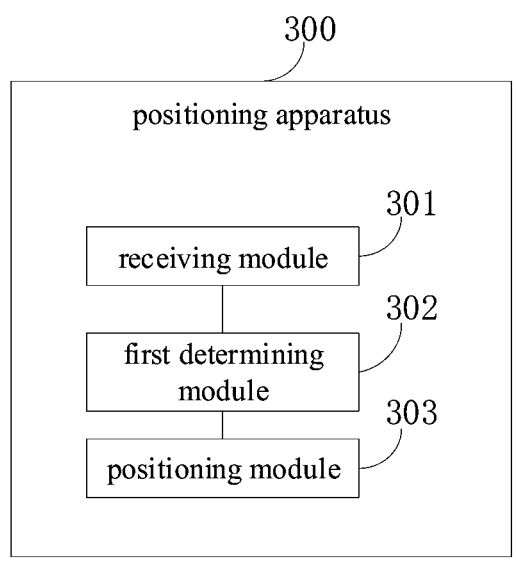
FIG. 3 is a schematic diagram of a positioning apparatus according to an embodiment of the disclosure.

FIG. 3 is a schematic diagram of a positioning apparatus according to an embodiment of the disclosure. As illustrated in FIG. 3, the positioning apparatus 300 includes: a receiving module 301, a first determining module 302 and a positioning module 303.

The receiving module 301 is configured to receive detection data sent by a positioning device, in which the detection data includes first satellite data of each of multiple satellites.

The first determining module 302 is configured to determine prediction noise of each of the satellites based on the first satellite data, and determine a weight of the satellites based on the prediction noise.

The positioning module 303 is configured to determine a position of the positioning device based on the weight and observation equations.

In an implementation, the first determining module 302 includes: an annotation unit and a first determining unit.

The annotation unit is configured to adding annotation information to the first satellite data with carrier phase cycle slips.

The first determining unit is configured to determine the prediction noise of each of the satellites based on the first satellite data and the annotation information.

In an implementation, the first determining unit is further configured to:

obtain the prediction noise of each of the satellites by inputting the first satellite data and the annotation information into a pre-trained noise prediction model.

In an implementation, the weight of the satellites is negatively correlated to the prediction noise.

In an implementation, the positioning apparatus 300 further includes: an obtaining module, a generating module and a second determining module.

The obtaining module is configured to obtain second satellite data of a reference station corresponding to the positioning device.

The generating module is configured to generate a first observation equation corresponding to the reference station based on the second satellite data, and generate a second observation equation corresponding to the positioning device based on the first satellite data.

The second determining module is configured to determine the observation equations based on the first observation equation corresponding to the reference station and the second observation equation corresponding to the positioning device.

In an implementation, the obtaining module includes: a second determining unit and an obtaining unit.

The second determining unit is configured to determine a coarse position corresponding to the positioning device based on the first satellite data.

The obtaining unit is configured to obtain the second satellite data of the reference station corresponding to the positioning device based on the coarse position.

In an implementation, the detection data includes inertial measurement unit (IMU) data of the positioning device, and the positioning apparatus 300 further includes: a fusing module, configured to update the position of the positioning device by fusing the IMU data and the position.

In an implementation, the positioning module 303 includes: a solving unit, configured to determine the weight of the satellites as a weight of the observation equations of the satellites, and obtain the position of the positioning device by solving the observation equations based on weighted least squares.

The apparatus of the embodiments of the disclosure can be used to execute the positioning method executed by the cloud device in the above method embodiments, and the implementation principle and technical effect thereof are similar, which will not be repeated here.

Figure 4:
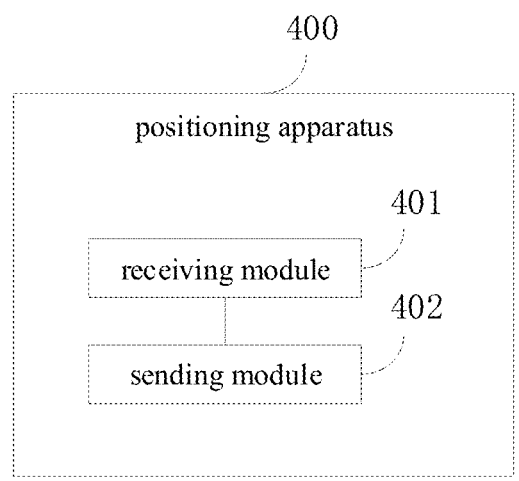
FIG. 4 is a schematic diagram of another positioning apparatus according to an embodiment of the disclosure.

FIG. 4 is a schematic diagram of another positioning apparatus according to an embodiment of the disclosure. As illustrated in FIG. 4, the positioning apparatus 400 includes: a receiving module 401 and a sending module 402.

The receiving module 401 is configured to receive signals from each of multiple satellites, and obtain first satellite data by analyzing the signals.

The sending module 402 is configured to send detection data to a cloud device, in which the detection data includes the first satellite data.

The receiving module 401 is further configured to receive a position of a positioning device sent by the cloud device, and the position of the positioning device is determined based on the first satellite data.

In an implementation, the detection data further includes IMU data of the positioning device, the IMU data is configured to update the position of the positioning device.

The apparatus in the embodiments of the disclosure can be used to execute the positioning method executed by the positioning device in the above method embodiments, and the implementation principle and technical effect thereof are similar, which are not repeated here.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

According to the embodiments of the disclosure, the disclosure provides an electronic device, and a non-transitory computer-readable storage medium having computer instructions stored thereon.

According to an embodiment of the disclosure, the disclosure also provides a computer program product including computer programs. The computer programs are stored in a readable storage medium, and at least one processor of the electronic device can read the computer programs from the readable storage medium. When the at least one processor executes the computer programs, the electronic device is caused to execute the solution according to any of the above embodiments.

Figure 5:
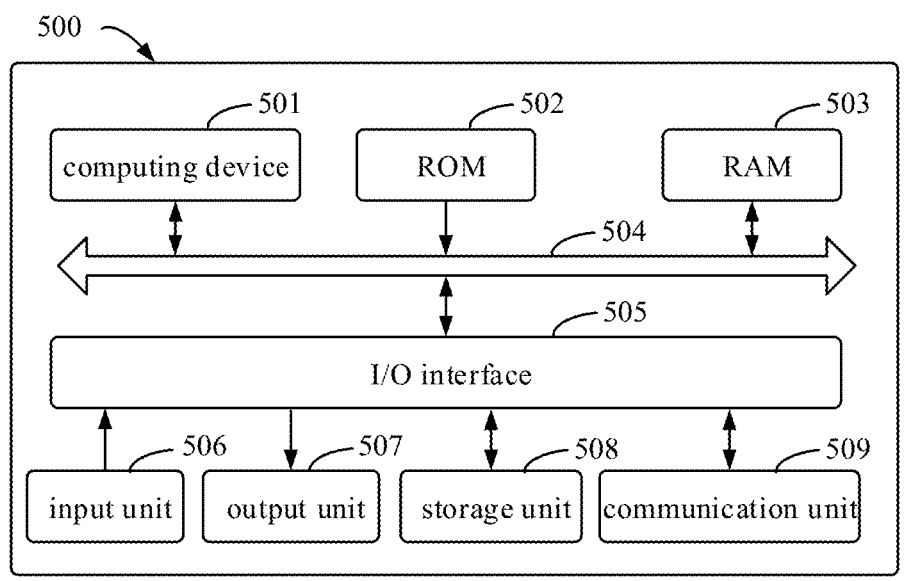
FIG. 5 is a block diagram of an electronic device used to implement the positioning method according to an embodiment of the disclosure.

FIG. 5 is a block diagram of an electronic device used to implement the positioning method according to the embodiment of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 5, the electronic device 500 includes: a computing unit 501 performing various appropriate actions and processes based on computer programs stored in a read-only memory (ROM) 502 or computer programs loaded from the storage unit 508 to a random access memory (RAM) 503. In the RAM 503, various programs and data required for the operation of the device 500 are stored. The computing unit 501, the ROM 502, and the RAM 503 are connected to each other through a bus 504. An input/output (I/O) interface 505 is also connected to the bus 504.

Components in the device 500 are connected to the I/O interface 505, including: an inputting unit 506, such as a keyboard, a mouse; an outputting unit 507, such as various types of displays, speakers; a storage unit 508, such as a disk, an optical disk; and a communication unit 509, such as network cards, modems, and wireless communication transceivers. The communication unit 509 allows the device 500 to exchange information/data with other devices through a computer network such as the Internet and/or various telecommunication networks.

The computing unit 501 may be various general-purpose and/or dedicated processing components with processing and computing capabilities. Some examples of computing unit 501 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 501 executes the various methods and processes described above, such as the positioning method. For example, in some embodiments, the positioning method may be implemented as a computer software program, which is tangibly contained in a machine-readable medium, such as the storage unit 508. In some embodiments, part or all of the computer program may be loaded and/or installed on the device 500 via the ROM 502 and/or the communication unit 509. When the computer program is loaded on the RAM 503 and executed by the computing unit 501, one or more steps of the method described above may be executed. Alternatively, in other embodiments, the computing unit 501 may be configured to perform the positioning method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service. The server may also be a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the principle of this invention shall be included in the protection scope of this invention.

What is claimed is:

1. A positioning method, implemented by a cloud device, the method comprising:
   receiving detection data sent by a positioning device, wherein the detection data comprises first satellite data of each satellite;
   determining prediction noise of each satellite based on the first satellite data, and determining a weight of each satellite based on the prediction noise; and
   determining a position of the positioning device based on the weight and observation equations of each satellite;
   wherein determining the prediction noise of each satellite comprises:
      adding annotation information to the first satellite data with carrier phase cycle slips; and
      determining the prediction noise of each satellite based on the first satellite data and the annotation information;
   wherein determining the prediction noise of each satellite based on the first satellite data and the annotation information comprises:
      obtaining the prediction noise of each satellite by inputting the first satellite data and the annotation information into a pre-trained noise prediction model.

2. The method of claim 1, wherein the weight of each satellite is negatively correlated to the prediction noise.

3. The method of claim 1, further comprising:
   obtaining second satellite data of a reference station corresponding to the positioning device, and generating a first observation equation corresponding to the reference station based on the second satellite data;
   generating a second observation equation corresponding to the positioning device based on the first satellite data; and
   determining the observation equations of each satellite based on the first observation equation corresponding to the reference station and the second observation equation corresponding to the positioning device.

4. The method of claim 3, wherein obtaining the second satellite data of the reference station corresponding to the positioning device, comprises:
   determining a coarse position corresponding to the positioning device based on the first satellite data; and obtaining the second satellite data of the reference station corresponding to the positioning device based on the coarse position.

5. The method of claim 1, wherein the detection data comprises inertial measurement unit (IMU) data of the positioning device, and the method further comprises:
obtaining a new position of the positioning device by fusing the IMU data and the position.

6. The method of claim 1, wherein determining the position of the positioning device comprises:
determining the weight of each satellite as a weight of the observation equations of each satellite, and obtaining the position of the positioning device by solving the observation equations based on weighted least squares.

7. A positioning method, implemented by a positioning device, the method comprising:
receiving signals from each satellite, and obtaining first satellite data by analyzing the signals;
sending detection data to a cloud device, wherein the detection data comprises the first satellite data; and
receiving a position of the positioning device sent by the cloud device, wherein the position of the positioning device is determined based on the first satellite data;
wherein the cloud device determines prediction noise of each satellite based on the first satellite data, determines a weight of each satellite based on the prediction noise; and determines a position of the positioning device based on the weight and observation equations of each satellite;
wherein the cloud device determines prediction noise of each satellite by:
adding annotation information to the first satellite data with carrier phase cycle slips; and
determining the prediction noise of each satellite based on the first satellite data and the annotation information;
wherein the cloud device determines the prediction noise of each satellite based on the first satellite data and the annotation information by:
obtaining the prediction noise of each satellite by inputting the first satellite data and the annotation information into a pre-trained noise prediction model.

8. The method of claim 7, wherein the detection data further comprises inertial measurement unit (IMU) data of the positioning device, the IMU data is configured to update the position of the positioning device.

9. A cloud device for positioning, comprising:
at least one processor; and
a memory stored with instructions executable by the at least one processor;
wherein when the instructions are executed by the at least one processor, the at least one processor is caused to:
receive detection data sent by a positioning device, wherein the detection data comprises first satellite data of each satellite;
determine prediction noise of each satellite based on the first satellite data, and determine a weight of each satellite based on the prediction noise; and
determine a position of the positioning device based on the weight and observation equations of each satellite;
wherein the at least one processor is further caused to:
add annotation information to the first satellite data with carrier phase cycle slips; and
determine the prediction noise of each satellite based on the first satellite data and the annotation information;
wherein the at least one processor is further caused to:
obtain the prediction noise of each satellite by inputting the first satellite data and the annotation information into a pre-trained noise prediction model.

10. The cloud device of claim 9, wherein the weight of each satellite is negatively correlated to the prediction noise.

11. The cloud device of claim 9, further comprising:
obtain second satellite data of a reference station corresponding to the positioning device;
generate a first observation equation corresponding to the reference station based on the second satellite data, and generate a second observation equation corresponding to the positioning device based on the first satellite data; and
determine the observation equations of each satellite based on the first observation equation corresponding to the reference station and the second observation equation corresponding to the positioning device.

12. The cloud device of claim 11, wherein the at least one processor is further caused to:
determine a coarse position corresponding to the positioning device based on the first satellite data; and
obtain the second satellite data of the reference station corresponding to the positioning device based on the coarse position.

13. The cloud device of claim 9, wherein the detection data comprises inertial measurement unit (IMU) data of the positioning device, and the at least one processor is further caused to:
obtain a new position of the positioning device by fusing the IMU data and the position.

14. The cloud device of claim 11, wherein the at least one processor is further caused to:
determine the weight of each satellite as a weight of the observation equations of each satellite, and obtain the position of the positioning device by solving the observation equations based on weighted least squares.

* * * * *